Dec. 15, 1970  W. FOERSTE ET AL  3,548,232

COLLECTOR RING UNITS FOR ELECTRIC MOTORS

Filed Aug. 19, 1969  2 Sheets-Sheet 1

INVENTORS
WALTER FÖRSTE
GOTTFRIED OSTERMAY
JOACHIM SCHREIBER
HANS WERNER NOACK
HANS SCHIEWART

BY

AGENT

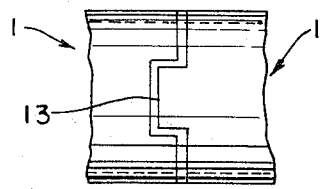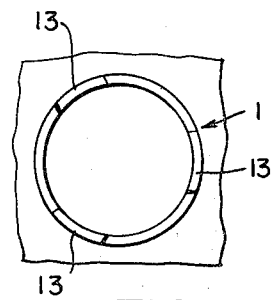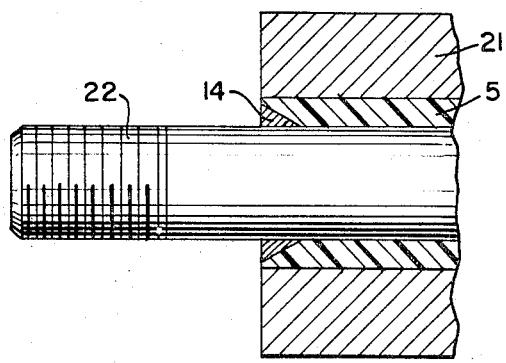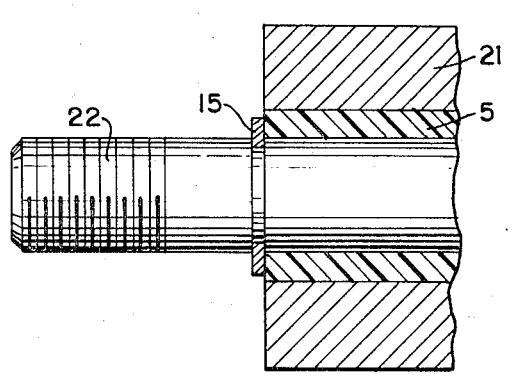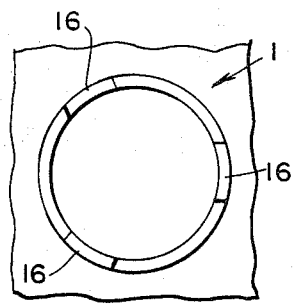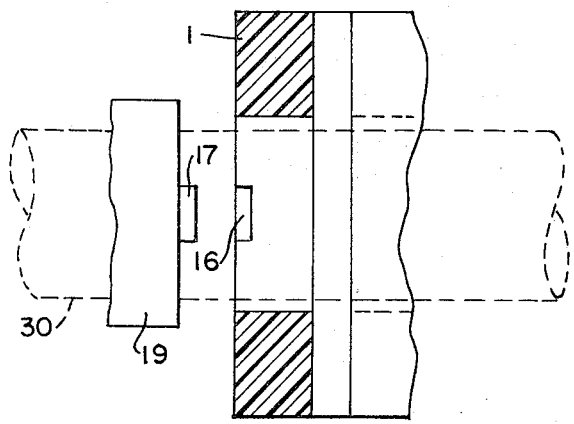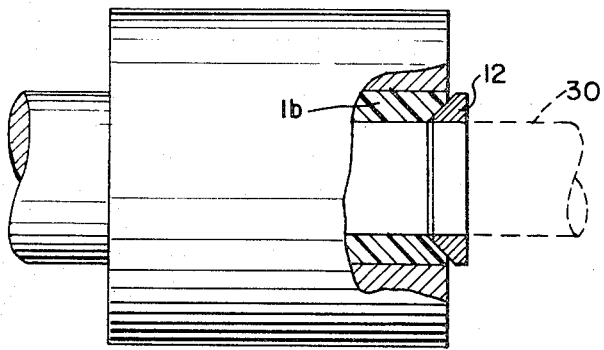

3,548,232
COLLECTOR RING UNITS FOR ELECTRIC MOTORS

Walter Foerste, Suhl, Thuringia, Gottfried Ostermay and Joachim Schreiber, Berlin, and Werner Noack and Hans Schiewart, Dresden, Germany, assignors to VVB Elektrogeraete, Berlin, Germany
Filed Aug. 19, 1969, Ser. No. 851,217
Int. Cl. H01r 39/08
U.S. Cl. 310—232    11 Claims

ABSTRACT OF THE DISCLOSURE

Collector ring units with carbon collector rings for electric motors, employing a supporting member consisting of individual sections made from plastic molding compounds. The number of supporting member sections is lower by one than that of the collector rings. Each section has a boss portion and a number of radial arms with sleeves thereon for receiving contact bolt means of the collector rings. The entire unit may be potted in a curing resin after its assembly.

---

The invention concerns the construction of collector ring units for electric motors wherein carbon collector rings are used. Such collector ring members include indivdual collector rings, their intervening supporting members as well as contact bolts and/or span bolts. The invention is concerned more particularly with improvements in the supporting members for the individual collector rings.

It is recognized that collector ring units are subject to high mechanical, electrical and thermal stresses in the operation of electric motors, hence the structural elements must be carefully fashioned in terms of weight, material and manufacturing specifications to meet stress requirements.

The use of carbon collector rings is generally conceded to be the most advantageous with respect to factors of weight, electrical function and economy of manufacture, wherein the use of a supporting member made from a plastic material is similarly held to be the most advantageous in light of those factors.

Unfortuitously, however, the desirable pairing of a carbon collector ring with a plastic supporting member was to be deleterious to the strength of the entire collector ring unit because of differing heat-expansion coefficients, that of carbon being in the low range of from 2.5 to 4.5 times $10^{-6}$ while that of plastic materials is in the relatively high range of from 20 to 50 times $10^{-6}$, also displayed by the metal lamillae used in these units.

Thus, the thermal drawback precluded the commercial mass production of collector ring units or members which combined the prime type carbon ring with the preferred supporting member made of a plastic material. Manufacturers and designers accordingly looked to alternative constructions.

For example, with an inorganic material of a ceramic base, such as porcelain or steatite, having low heat-expansion coefficient of from 3.5 to 4.5 times $10^{-6}$, a supporting member was constructed nad found to be thermally and operably compatible with the low heat-expansion carbon collector rings.

Yet it was found that the processing of such inorganic materials did not permit of a dimensionally precise design of component structural parts, and attempts were made to intermix workable substances with the ceramic bases to overcome this defect.

Thus it is known to overlay unfinished ceramic supporting member blanks with steel, iron or lightweight metal at the junction with or about the seating surfaces of the collector rings. Such painstakingly overlaid surfaces were found to work out to exact desired dimensions.

Other remedies have been disclosed, such as a synthetic resin condensate or deposit or the application of a plastic compound in powder form onto the unmachined seating surfaces of ceramic supporting members so as to finish these sites without difficulty.

However, none of these measures could completely and economically bridge the problems encountered in the processing of ceramic supporting members as compared to the clearly more favorable properties of such members made from a plastic molding compound.

Therefore, another alternative sought the pairing of the high-heat-coefficient plastic supporting member with a collector ring other than the non-metallic, low-coefficient carbon type. One solution favored the employment of metal collector rings whose metal lamellae were found to possess, as mentioned before, a heat-expansion coefficient in the high range similar to that of the plastic elements, and this combination did not appear detrimental to the strength of the entire collector ring unit in its operation.

The production of such substitute ring-and-support units proved very costly, however, and not only were these constructions uneconomical but they constantly required additional measures to attain operating efficiency. As for example, to maintain reciprocal insulation of the contact bolts as well as the collector rings of differing polarity, it was often necessary to add a mica plating of the contact bolts, or to use separate sleeve-like spacing elements made of insulating material.

An object of the invention is to eliminate the drawbacks resulting from the use of ceramic materials for producing supporting members, i.e. to simplify the costly processing, particularly on the seating surfaces of the collector rings, diminish the weight of the collector ring units, and increase the strength thereof.

An additional object is, therefore, to produce a plastic supporting member and to circumvent the drawback of thermal origin which hitherto has militated against the use of this material for the construction of the supporting members, through an improved structural design thereof.

The inventive design of the novel supporting members proposes to eliminate the shortcomings caused by the differing heat-expansion coefficients of carbon and plastic and thus to permit the unaided application of a plastic material in the construction of collector ring units, whereby all the known advantages of ring units of this type can be fully utilized.

According to one of the important features of the invention the problem is solved in that the supporting member of a multisectional collector ring unit has a plurality of sections which correspond to the differential "number of collector rings minus one." These supporting sections have cylindrical boss parts with a smaller diameter than the inside diameter of the collector rings, but greater length than that of the rings. The sections have disposed bead-shaped ridges spheroidally on the circumference thereof, whose number corresponds to the number of contact bolts, and whose outer surfaces constitute contact areas for the collector rings.

Said collector-ring contact areas have eccentrically disposed supporting arms which extend radially in a prolongation of the contact areas and lie in one plane, and upon these arms are mounted axially aligned sleeves to accommodate the contact bolts which terminate on both sides of contact surfaces of the arms in a plane with the frontal surfaces of the boss parts, and whose outside diameters correspond to the bores in the collector rings which accommodate the contact bolts.

These axially aligned sleeves may be also inserted in the arms of the supporting member sections as separate parts in that the bores of the arms, which latter lie in one plane, are widened on both sides for the accommodation of the contact bolts to the dimensions of said bores in abutting areas of the rings. In this construction the axial length of the widened bores in the arms preferably corresponds to the surplus by which the length of the individual sleeves exceeds one half of the dimension of the collector rings.

The respective contact surfaces of the supporting arms, which abut the carbon collector rings, may have their free ends designed in the shape of hook-like flanges which engage in corresponding revolving or locally disposed recesses in the collector rings and intercept the latter in opposition to the generated centrifugal forces.

To produce an effective cooling air current and a favorable eddy formation, as well as in order to diminish leakage paths, the supporting arms may be streamlined at their free ends, for example, by having them terminate in an obtuse angle.

A three-point contact would entail difficulties in contact ring units with a larger diameter to the extent that the collector rings were then unsupported over a greater region and would therefore be more sensitive to mechanical stresses. To avoid this drawback the supporting arms of larger collector ring units may be connected with one another by means of profiled braces which follow the perimeter of the collector ring bores.

To obtain an action area for a stripping tool, in order to assist favorable current distribution inside the carbon collector rings, and achieve maximum stability thereof, due to approximately equal cross sections, the bore surfaces of the collector rings may be provided between the collector-ring contact areas with cutouts, the latter preferably having a curved shape and extending from one contact area to the other.

The individual supporting member sections may be connected with one another by means of complementary frontal profiles of the cylindrical boss parts and/or by way of mutually meshing journals.

Permanent, easily disengageable connection between shaft and collector ring member may be attained, according to the invention, in that the cylindrical boss part of an outer supporting member section is provided with recesses which are distributed on the periphery of its frontal surface, and into which engage, so as to form a union, journals of a disk secured to the front surfaces of the associated shaft.

An additional securing method may consist in designing the supporting member boss conically and/or with a roughened surface, and to screw onto the shaft a counter-disk with a complementary shape which presses the collector ring member against the surface on the outer side and completely transmits the torque of the shaft onto the collector ring unit.

Inner stablity may additionally be imparted to the unit itself through wedge-type securing of the contact and/or span bolts in the sleeves of the supporting arms, which envelop them, by means of separate conically designed arresting sleeves, or with the aid of known arresting means, for example, retaining rings, which lock on said contact bolts, respectively protruding from the arms of the outer supporting member sections.

To stabilize it after assembly is completed, the entire collector ring unit may be potted in a curing resin. For reasons of molding and finishing techniques, as well as in order to obtain satisfactory penetration of the resin, the invention suggests to make the collector-ring contact areas conical, for example in axial direction, and/or they may be made with strongly serrated surfaces and/or with markedly rippled edges.

Similarly the sleeves arranged on the supporting arms, and provided for receiving the contact bolts, may be fashioned in a conical shape on their outer and inner surfaces, and/or have strongly serrated surfaces.

Furthermore, in order to obtain proper penetration of the resin between the supporting arms and the collector rings, the contact surfaces of the former may be equipped with discontinuous surfaces, for example with serrated surfaces. The small bulk of the supporting member keeps the heat expansion thereof, when the motor is in operation, at a low level, and the extensive embedding of all parts in the curing resin gives the collector ring unit substantial strength.

It is one of the principal advantages of this invention that the collector ring unit in this construction is characterized by an economically favorable and technically uncomplicated production, in that the supporting member sections are preferably molded in one piece, with the structural design making possible favorable molding procedures.

It is a particular advantage that, by means of these supporting member sections, the collector rings are insulated from one another and, simultaneously, also relative to the contact bolts and/or span bolts which pass through them. Refinishing work is not required because any inaccuracy of the dimensions which may occur is counteracted by the inflowing resin.

It is a further advantage that the number of structural parts of the inventive collector ring units is reduced to a minimum. Embedding of the entire collector ring unit in the aforementioned curing resin imparts a strength which is satisfactory in respect of all requirements.

Furthermore, there is the advantage of proper cooling air current in the entire collector ring unit, reducing to a minimum the temperature rise in the electric motor while in operation.

The several objects, characteristic features and pertinent advantages of this invention will be more apparent from the following description of preferred embodiments of the collector ring units according to the invention, given by way of examples, when considered in conjunction with the accompaning drawings, wherein FIG. 1 is a view in perspective of an exemplary embodiment of a collector ring unit according to the invention, prior to the assembly thereof;

FIG. 8 is a side view of a journal connection of the boss portions on the supporting member sections;

FIG. 9 is a frontal view of a boss portion as shown in FIG. 8;

FIG. 10 is a sectional view of a supporting arm sleeve, with bolt and arresting sleeve;

FIG. 11 is another sectional view of a supporting arm sleeve, with bolt and retaining ring;

FIG. 12 is a side view of a journal connection between a collector ring unit and the associated shaft;

FIG. 13 is a frontal view of a boss portion, similar to FIG. 9; and

FIG. 14 is a partly sectional view of a boss portion, with a conical counter-disk.

Figure 1:
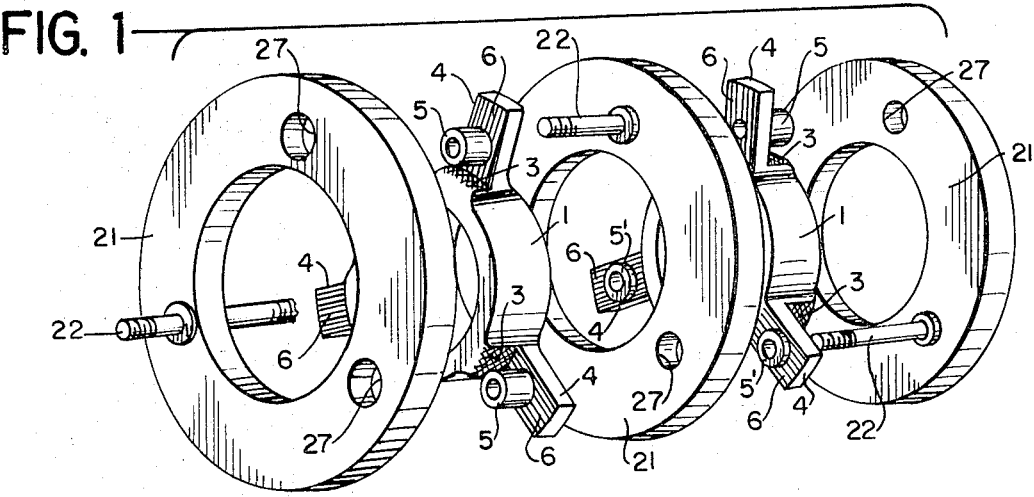

Referring now to the drawings, FIG. 1 is a view of a collector ring unit according to the invention, comprising, as a matter of example, two supporting member sections generally identified by numeral 1 and three collector rings 21 in alternating arrangement. Units with a smaller or larger number of elements can also be assembled according to the invention as long as the number of the supporting member sections is lower by one than that of the collector rings. The figure shows the elements before assembly, and it will be understood by those skilled in the art that the "exploded" illustration only serves the purpose of greater clarity; when assembled the elements 1 and 21 are in close contact and interengagement, as will be explained later in more detail.

Each of the supporting member sections has a cylindrical boss portion at 1 whose diameter is smaller than the inside diameter of the collector rings 21. On the other hand, the length of the boss portions is greater than that of the rings, preferably twice as great.

Each collector ring 21 has associated therewith a contact bolt or span bolt 22, as shown, with threaded terminal portions by the aid of which the multisection collector ring unit is held together after assembly. The rings 21 have bores 27, one of which has the contact bolt 22 mounted therein, as will be explained somewhat later in more detail.

The boss portions 1 have disposed on their circumference, corresponding to the number of bolts 22, e.g. three spheroidally distributed bead-shaped ridges whose outer surfaces constitute collector-ring contact areas 3. each of these areas has a respective eccentrically disposed supporting arm 4, lying in the same plane, each arm extending radially in a prolongation of the collector-ring contact area 3, and upon each of which is mounted an axially aligned sleeve 5 to accommodate one of the contact bolts 22 passing therethrough when the unit is assembled.

Figure 5:
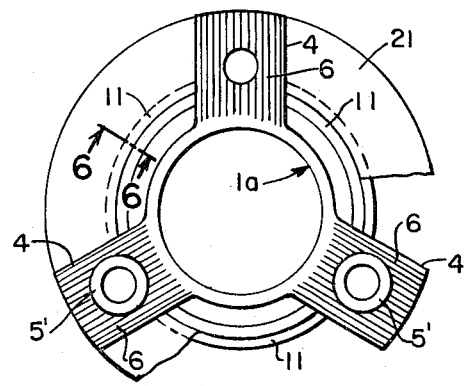
FIG. 5 is a view of a modified supporting member section, with a profiled brace engaging the respective collector ring.
Figure 7:
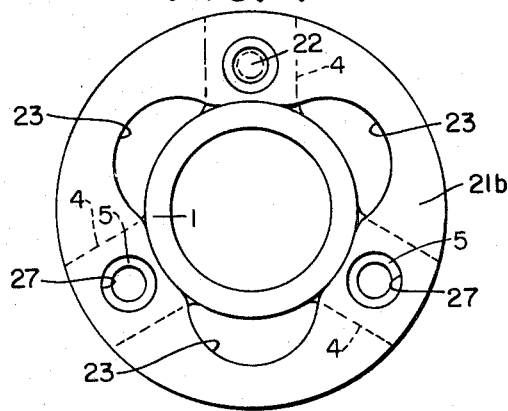
FIG. 7 is a side view of a modified collector ring having curved cutouts.

The supporting arms 4 have contact surfaces 6 on both sides, while the sleeves 5 terminate on these surfaces 6 in one plane with the frontal surfaces of the boss portions 1, and their outside diameter corresponds to the diameter of the aforementioned bores 27 in the rings 21. It can be seen from FIG. 1 (as well as from FIGS. 5 and 7) that each ring 21 actually has three bores 27 of which only one has the contact bolt 22 secured thereinto, in alternating fashion among the three rings, while the two other bores receive the bolts which are respectively secured to the remaining rings of the unit, as shown. It will be understood that a unit having two or four collector rings might also be assembled with three bolts, as shown, although the number of the latter may be increased if there is a corresponding number of supporting arms on the intermediate supporting member sections.

On the surfaces 6 of arms 4, opposite to where the sleeves 5 are mounted, flanges 5' may be provided, as shown, as a matter of example, in the right-hand section of FIG. 1.

Figure 2:
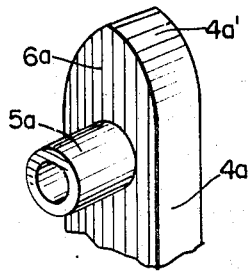
FIG. 2 is a partial view in perspective of an end of a modified supporting arm similar to that of FIG. 1.

FIG. 2 is a partial view of a modified supporting arm 4a, otherwise similar to that shown in FIG. 1, wherein the free end 4a' is streamlined so as to form a substantially obtuse angle with a view to diminishing possible leakage paths. A sleeve 5a and a frontal surface 6a are shown, substantially similar to the corresponding elements in FIG. 1.

In accordance with basic characteristics of the present invention, the supporting member sections 1, the arms 4, 4a, the sleeves 5, 5a, the flanges 5', etc. as well as modifications thereof to be described later are preferably made from a plastic material, while the collector rings 21 are of carbon, and the contact bolts 22 consist of metal.

Figure 3:
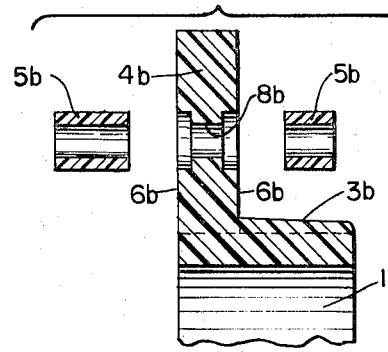
FIG. 3 is a side view of another type of a supporting arm, having separate sleeves.

FIG. 3 shows another type of a supporting arm, identified by numeral 4b, in which sleeves 5b may be installed as separate parts. To this end, bores 8b in the arms 4b are widened on both sides for the accommodation of the separate sleeves 5b which in turn receives the contact bolts 22 of the rings 21, as explained before. In this construction the axial length of the widened bore portions corresponds to the surplus by which the length of the sleeves 5b exceeds one half the thickness of the collector rings 21. A contact area 3b as well as surfaces 6b are also shown, substantially similar to the corresponding elements of the supporting member section 1, as described in connection with FIG. 1.

Figure 4:
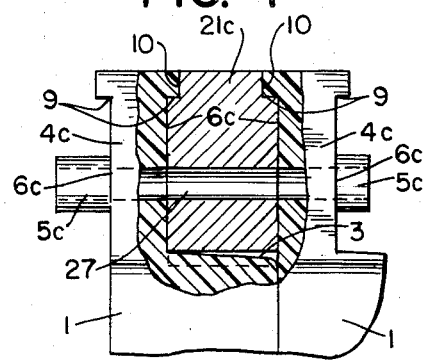
FIG. 4 is a partly sectional view of two supporting arms, with hook-like flanges and a collector ring with corresponding recesses.

FIG. 4 shows two modified supporting arms 4c having sleeves 5c and contact surfaces 6c, flanking a modified collect or ring 21c (in assembled arrangement). In order to intercept centrifugal forces which may be generated and damage the structure of the carbon collector rings which are not as strong as metal rings, the contact surfaces 6c have at their free ends hook-like flanges 9 which are accommodated in corresponding recesses 10 in the ring 21c. The flanges 9 prevent the forcible destruction of the collector rings.

Figure 6:
FIG. 6 is a partial sectional view along line 6—6 of FIG. 5.

In collector ring units having a larger diameter, owing to the three-point contact method provided by way of the bolts 22, there is the danger of damage by suddenly occurring mechanical stresses coming from the outside, either during the assembly, the standstill or the operation of the electric motor. This is prevented in that the supporting arms 4 of section 1a are connected with one another by means of a profiled brace 11 (see FIGS. 5 and 6) which follow the roundness of the bore in the associated collector ring 21 and prop up the same. FIG. 6 shows the interengagement of a brace 11 with a ring 21. It should of course be understood that one or more supporting member sections may be provided with such profiled braces.

To obtain an action area for a stripping tool and the like, and in order to assist favorable distribution of the current inside the carbon collector rings and achieve maximum stability thereof due to approximately equal cross sections, the surfaces for the bores 27 are provided in modified ring 21b (see FIG. 7) between the collector-ring contact surfaces with cutouts 23, preferably having a curved shape and extending from one contact surface to the other. The remaining elements shown in FIG. 7 have all been described before, and it will be clear that the modified collector ring 21b has a supporting member section 1 behind it, with the associated arms 4 and two flanges 5 thereon; one of the bores 27 has a contact bolt 22 passing therethrough.

After producing the carbon collector rings and the supporting member sections, preferably by molding, the collcollector ring unit is assembled in the order as shown in FIG. 1 (regardless of the number of sections used therein). Subsequently, all structural parts of the unit are immobilized by known retaining means, for example by the aid of the contact bolts 22 themselves, and the unit is then immersed in an electrically insulating curing resin. The resin will penetrate to all surfaces of the collector ring unit, and into sleeves 5 (as well as 5a, 5b, 5c) of the contact bolts 22 which protrude through said sleeves.

In this connection the penetration of the resin between collector rings and collector-ring contact areas on the respective supporting member sections is extremely favored by a conical shape thereof, and additionally assisted through a strongly serrated surface and/or by markedly rippled edges.

Penetration of the resin, both between contact bolts 22 and sleeves 5, as well as the latter and collector rings 21, is assisted by a similar design of sleeves 5 etc. diposed on armc 4 etc., that is, on their inner and/or outer surfaces. Contact surfaces 6 etc. of arms 4 may also have a rippled surface, enabling satisfactory penetration of the resin between collector rings 21 etc. and supporting arms 4.

The complete embedding of the entire collector ring unit in curing resin imparts to it extraordinary strength. Resin which may have remained on the raceways of the collector rings is removed, e.g. by grinding.

Extremely important is the effective cooling of the collector ring unit during the operation of the electric motor. Thet proper cooling-air flow is produced by the spaces existing between the rings and the boss portions, as well as by the large spaces between the rings themselves. The streamlined design of the unattached or free ends of the supporting arms tends to create favorable eddy formation of the cooling-air flow, and the decrease of the leakage path.

The frontal surfaces of the boss portions 1 may be designed as flange-like profiles 13 (see FIGS. 8 and 9) which complement each other, providing good union between the individual supporting member sections 1 with one another when the unit is assembled.

The collector ring 21 itself is given inner strength through the splining of the contact bolts 22 in the sleeves 5 by means of separate, conically shaped arresting sleeves 14 (shown in FIG. 10) or by means of retaining rings 15 (see FIG. 11), which lock unto the bolts 22 respectively protruding from the supporting arm 4 of the outer porting member sections.

The thus completed collector ring unit is thereafter mounted on a shaft 30, while the outer front faces of the boss portions 1 may be provided with slots 16 (see FIGS. 12 and 13). The shaft 30 has a plate or disk member 19 thereon with a protruding journal member 17 adapted to mate with a slot 16 in the boss portion 1 so as to produce a permanent but easily detachable union between the respective supporting member sertion of the collector ring unit and the shaft.

Another way of securing the unit upon the shaft 30 is that a modiled boss portion 1b is made to have a conical and/or roughened surface, and that a counterplate or disk member 12 with a corresponding complementary confiuration is secured unto the shaft, power-coupled with said boss portion 1b upon assembly, whereby the torque of the shaft 30 is fully transmitted to the collector ring unit by way of the supporting member section having the boss portion 1b thereon.

What we claim is:
1. A multisection collector ring unit for electric motors, comprising, in combination, at least two collector rings, a corresponding number of contact bolt means, each being associated with a respective one of said rings, the latter having therein a number of bores adapted to receive portions of the contact means associated with the other rings when the unit is assembled, at least one supporting member section between a pair of said rings, the number of said at least one section being lower by one than that of said rings, each section having thereon a cylindrical boss portion with a diameter smaller than the inside diameter of said rings but a length greater than that of said rings, each section having furthermore a number of ridges circumferentially and symmetrically disposed thereon, the outer surfaces of said ridges constituting contact areas for said rings, said sections having rigid therewith radially extending and eccentrically disposed supporting arms, the number of said ridges and said arms corresponding to that of said contact means, and a number of sleeves mounted on said arms for accommodating therein said contact means, said sleeves terminating on both sides of contact surfaces of said arms in a plane with the frontal surfaces of said boss portions, and having outside diameters corresponding to said bores in the rings so as to fit thereinto when the unit is assembled.

2. The collector ring unit as defined in claim 1, wherein said boss portions are provided with complementary, frontal profiled section for securely interconnecting said at least one supporting member section when the unit is assembled.

3. The collector ring unit as defined in claim 1, further comprising conically shaped arresting sleeves interposed between said contact means and said sleeves which accommodate the former, for purposes of increasing mechanical stability of the unit when it is assembled.

4. The collector ring unit as defined in claim 1, further comprising retaining rings in engagement with said contact means in the vicinity of said sleeves which accommodate the former, for purposes of increasing mechanical stability of the unit when it is assembled.

5. The collector ring unit as defined in claim 1, wherein the unit includes a shaft passing through said rings and said at least one supporting member section, and further comprising a mating pair of journal means on said shaft and on said at least one section for securely interconnecting the same for simultaneous rotation.

6. The collector ring unit as defined in claim 5, wherein said journal means includes a disk member secured to said shaft and a pair of complementary recessed and protruding portions on said shaft, on the one hand, and on said at least one supporting member section, on the other hand, the latter being the outermost one in the unit.

7. The collector ring unit as defined in claim 1, wherein the unit includes a shaft passing through said rings and said at least one supporting member section, and the latter has a frictionally engageable terminal surface, and further comprising a disk member secured to said shaft, with a complementary surface adapted to engage said terminal surface so as to transmit torque from said shaft to the unit.

8. The collector ring unit as defined in claim 7, wherein said terminal surface and said complementary surface have mating conical profiles.

9. The collector ring unit as defined in claim 7, wherein said terminal surface and said complementary surface are roughened for increased frictional engagement.

10. The collector ring unit as defined in claim 1, wherein the unit is potted in a curing resin after its assembly for added stability, and said contact areas of the ridges have a conical form so as to obtain satisfactory penetration of said resin.

11. The collector ring unit as defined in claim 1, wherein the unit is potted in a curing resin afer its assembly for added stability, and said contact areas of the ridges have at least one of their surface and edge areas serrated so as to increase the adherence of said resin.

References Cited
UNITED STATES PATENTS

| | | | |
|---|---|---|---|
| 1,431,295 | 10/1922 | Evans | 310—232 |
| 1,460,031 | 6/1923 | Meyercordt | 310—232 |
| 1,580,530 | 4/1926 | Rambo | 310—232 |
| 1,756,004 | 4/1930 | Barr et al. | 310—232 |
| 2,981,916 | 4/1961 | O'Brien | 310—232 |

DONOVAN F. DUGGAN, Primary Examiner

L. L. SMITH, Assistant Examiner